Sept. 12, 1972    E. K. JONES    3,690,839
HEAT EXCHANGE APPARATUS
Filed Oct. 26, 1970

INVENTOR:
Edwin K. Jones

BY:
*James P. Hoston, Jr.*
*Ronald H. Hauseh*
ATTORNEYS

United States Patent Office 3,690,839
Patented Sept. 12, 1972

1

3,690,839
HEAT EXCHANGE APPARATUS
Edwin K. Jones, Kenilworth, Ill., assignor to Universal
Oil Products Company, Des Plaines, Ill.
Filed Oct. 26, 1970, Ser. No. 84,012
Int. Cl. B01n 9/04; F28f 9/02
U.S. Cl. 23—260                                6 Claims

ABSTRACT OF THE DISCLOSURE

A heat exchange apparatus which has special utility when utilized to separate water from the effluent of an endothermic catalytic reaction utilizing super heated steam as a heat exchange medium. The apparatus is comprised of a floating tube bundle contained within a heat exchange chamber. The tube bundle includes a substantially horizontal fixed tube sheet that extends completely across and is attached to the interior of heat exchange chamber, a substantially horizontal floating tube sheet spaced from the first tube sheet disposed across the heat exchanger, and a plurality of spaced apart vertical heat exchange tubes connected between the tube sheets, the interior of the heat exchange tubes communicating through the tube sheets. The interiors of the tubes establish a group of mixture passageways and the space around the tubes establishes a group of heat exchange passageways. A condenser is disposed downstream of the mixture passageways for condensing the vapor water in the mixture to liquid. A settling tank, located downstream of a condenser, is used for settling and separating the liquid water from the hydrocarbon. Water is carried to the heat exchange passageways of the tube bundle where it is placed in indirect heat exchange relationship with the total mixture and the temperature of the water is raised and the temperature of the total mixture in the mixture passageways is lowered.

---

This invention relates to a heat exchange apparatus useful in conjunction with an endothermic catalytic conversion of hydrocarbons. It particularly relates to a heat exchange apparatus that separates water from a mixture of water and a hydrocarbon and which recovers heat from low grade steam which then can be utilized for a conversion process.

An example of a process which may utilize the present invention is the dehydrogenation of ethylbenzene to styrene. Those skilled in the art recognize the importance of being able to economically produce styrene since this chemical, otherwise called phenylethylene, is extensively employed throughout commerce as a raw material for the production of resins, plastics, and elastomers. Although styrene may be covered in limited quantities from various coal tars and heavy crude oils, it is preferred to synthesize large quantities by dehydrogenation of ethylbenzene. The raw material, ethylbenzene, can either be separated from petroleum fractions by super-distillation or can be synthetically prepared, such as through the alkylation of benzene with ethylene.

Methods for producing styrene are generally carried out by passing a mixture of ethylbenzene and steam over a fixed bed of dehydrogenation catalysts. Since the basic chemical reaction involved, namely the dehydrogenation of ethylbenzene to styrene, is endothermic there is a significant decrease in the reaction zone temperature as the reaction proceeds. It is not unusual to witness a drop of perhaps 50° F. to 150° F. within the reaction zone or across a particular catalyst bed. Naturally, as a temperature decreases, the repetity and efficiency of the reaction also decreases so that the overall conversion to styrene declines to a point where it would be economically unattractive. This problem has been solved in the past by passing the ethylbenzene through a series of fixed beds of dehydrogenation catalysts and between such beds introducing super heated steam at temperatures sufficient to maintain the reaction of ethylbenzene to styrene but at low enough temperatures so as to not thermally decompose or crack the ethylbenzene. A disadvantage inherent in this particular method is the utility costs in raising the temperature of large quantities of steam to a level required for effecting the dehydrogenation of the ethylbenzene and then subsequently wasting large amounts of low grade heat by condensing the steam to water and removing the condensate from the process area. Thus, failure of the prior art to carefully utilize all of the heat available in the low grade steam remaining in the effluent from the conversion zone has made it extremely difficult, even with modern innovations, to produce styrene in an economical manner.

Prior art apparatus has utilized a heat exchange device to utilize the high grade heat available in the effluent steam. However, it is believed that the present invention provides for a heat exchange apparatus that more efficiently utilizes heat available from the low grade steam remaining in the effluent from a conversion zone. Prior art heat exchange apparatus has included outer housings having accordion shells permitting the thermal expansion of the inner tubing or coils without detrimental effects on the apparatus. The expense of such apparatus is generally prohibitive, and in addition requires auxiliary piping, vessels, etc. The present apparatus negates the use of the costly accordion shell design and provides for efficient heat transfer and maximum retention of heat in the heat exchange media., Accordingly, it is a principal object of this invention to provide for a heat exchange apparatus for the recovery and separation of water from a vapor mixture of water and a hydrocarbon, whereby the low grade heat in the water vapor may be utilized.

Another object of this invention is to provide for an apparatus for the conversion of a hydrocarbon which includes a heat exchange apparatus which recovers a substantial portion of the heat available in the low grade steam remaining in the effluent from the conversion portion of the conversion apparatus.

In one of its broadest aspects, the present invention provides for a heat exchange apparatus which comprises: (a) a heat exchange chamber; (b) a floating tube bundle contained within said heat exchange chamber having mixture passageways and heat exchange passageways contacting each other; (c) inlet means connected to the mixture passageways of said tube bundle for introducing the total mixture therein; (d) condenser means disposed downstream of said mixture passageways for condensing the vapor water in said mixture to a liquid water; (e) settling means downstream of said condenser means for settling and separating the liquid water from the hydrocarbon; (f) means to carry liquid water through the heat exchange passageways of said tube bundle, whereby said liquid water is in indirect heat exchange relationship with the total mixture and whereby the temperature of said water is raised and the temperature of the total mixture is lowered.

Preferably, the condenser means and settling means are disposed within the heat exchange chamber below the floating tube bundle. Of course, the condenser means will condense a portion of the hydrocarbon in the total mixture. The amount of hydrocarbons condensed will, of course, depend upon the pressure and temperature within the apparatus and upon the particular hydrocarbon in the total mixture and the temperature of the coolant in the condenser. The settling means will serve to separate the liquid water from any liquid hydrocarbon condensed by the condenser means. In a preferred embodiment the condensed water from the total mixture will provide the water for said heat exchange passageways.

The floating tube bundle will comprise a substantially horizontal fixed tube sheet disposed completely across and attached to the interior of the heat exchange chamber, a substantially horizontal floating tube sheet spaced from the first tube sheet and disposed substantially across the heat exchange chamber, and a plurality of spaced apart vertical heat exchange tubes connected between the tube sheets, the interiors of the tubes communicating through the tube sheets. Thus, the interiors of the tubes establish one group of passageways and the space around tubes establish the other group of passageways. Preferably, the interiors of the tubes establish the mixture passageways and the space around the tubes establish the heat exchange passageways.

In another embodiment, a second floating tube bundle comprising the same elements as the first tube bundle is disposed in a heat exchange chamber in series with the first floating tube bundle. Also, particularly for styrene production a water quench means may be disposed downstream of the effluent passageways of the first tube bundle for introducing liquid water in direct heat exchange relationship with the total effluent and there is provided means downstream of the condenser means to carry the liquid water from the settling means to this liquid quench means. Preferably, all of these elements are located within a single heat exchange chamber.

Another aspect of this invention provides for an apparatus for the conversion of a hydrocarbon which comprises (a) a reaction chamber having means for converting said hydrocarbon; (b) hydrocarbon inlet means connected to said reaction chamber for introducing said hydrocarbon therein; (c) vapor inlet means connected to said reaction chamber for introducing a vapor water as a heat exchange medium into said reaction chamber to admix with said hydrocarbon and to maintain the temperature and pressure of the admixture at reaction conditions; (d) a heat exchange chamber; (e) a floating tube bundle contained within said heat exchange chamber having effluent passageways and heat exchange passageways and liquid passageways contacting each other; (f) means connected to the downstream end of said reaction chamber and to the mixture passageways of said tube bundle for introducing the total effluent from the downstream end of said reaction chamber into said mixture passageways; (g) condenser means disposed downstream of said mixture passageways for condensing the vapor water in said total effluent to a liquid water; (h) settling means downstream of said condenser means for settling and separating the liquid water from the total effluent; (i) means for carrying liquid water through the heat exchange passageways of said tube bundle, whereby said liquid water is in indirect heat exchange relationship with the total effluent and whereby the temperature of said water is raised and the temperature of the total effluent is lowered; (j) heater means communicating with the downstream end of said heat exchange passageways for heating the water therefrom to the extent where it may be utilized as a vapor heat exchange medium for said reaction chamber; (k) means for transferring the vapor water from said heater means to the vapor inlet means of said reaction chamber, and (l) outlet means disposed downstream of said condenser means for removing separated fractions of said total effluent. Preferably, the reaction chamber and heat exchange chamber are vertically disposed and the effluent flow through the reaction chamber is generally upwardly, and, through the heat exchange chamber generally downwardly. For the floating tube bundle, the downward direction of flow for the effluent is preferred since any condensate of the effluent will flow downwardly more readily and any leakage of water past the floating tube sheet shall fall to the water settling section below. The upward flow in the reaction chamber is preferred since the two chambers can be arranged so that the outlet from the reactor chamber is close to the inlet to the floating tube bundle, thus preserving heat and costly piping and reducing the time in this piping, which prevents formation of poly-styrene when utilized for styrene production. Also, the upward direction of flow through the reaction chamber is preferred when the reaction chamber contains a catalyst for converting a hydrocarbon, since with upward flow there is less possibility of flow blockage in the catalyst section.

Reference to the accompanying drawing and a following description thereof will serve to point out and more fully illustrate the design and construction of this invention as well as to assist in further pointing out advantageous features in connection thereof.

Figure 1:
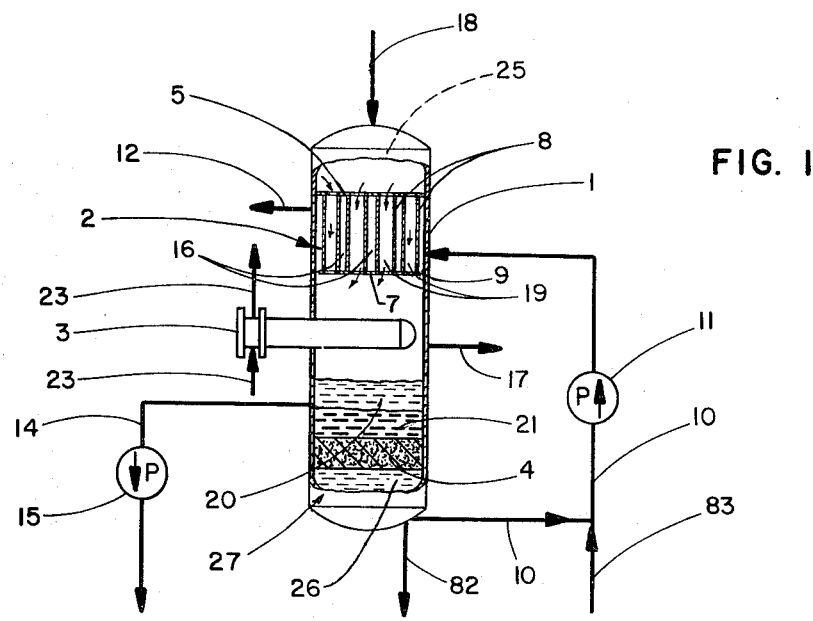
FIG. 1 is an elevational view shown partially in section of the heat exchange apparatus of this present invention.

Referring now more particularly to FIG. 1 of the drawing there is shown a vertical heat exchange chamber 1 in which a floating tube bundle 2 is disposed. The floating tube bundle 2 has mixture passageways 19 and heat exchange passageways 16 contacting each other. The passageways are formed by a plurality of vertically positioned spaced apart heat exchange tubes 8 which are connected to a fixed tube sheet 5 which in turn is attached to the interior of chamber 1, and a floating tube sheet 7 which is disposed across chamber 1 but is not fixed to the chamber. Tubes 8 would be spaced over the entire lateral area of chamber 1. Floating tube sheet 7 may be spaced a short distance 9 from the interior of chamber 1. A conduit 18 or other form of inlet means is connected to the mixture passageways 19 via manifold 25 for introducing the mixture of hydrocarbons and steam therein. Spaced below the floating tube bundle is a condenser 3 which is located downstream of the mixture passageways 19. Of course, the condenser 3 is shown schematically and may comprise a series of tube or coils serving as a heat exchange conduit for the coolant. Line 23 provide the means for supplying the coolant to condenser 3. Condenser 3 should be of such capacity and design to condense the vapor water in the total mixture into the liquid water phase. Below condenser 3 is a settling tank 27 which is used for settling and separating the liquid water condensed from the condenser from any condensed hydrocarbon. A filter 4 is used in the water portion 21 of the settling section to coalesce and filter any contaminants in the water. A conduit 10 and a pump 11 serve as a means to carry the liquid water from the lower portion 26 of the settling means through the heat exchange passageways 16 of tube bundle 2. Of course, there are provided conduits 14 and 17 and pumps 15 as outlet means for removing gaseous and liquid hydrocarbon fractions from the heat exchange chamber 1. It is noted that numeral 20 represents the hydrocarbon liquid level in the heat exchange chamber 1. The recycle liquid water is caused to pass through conduit 10 and into the heat exchange passageways 16 of the tube bundle whereby the liquid water is in direct heat exchange relationship with the total mixture in passageways 19 to thus cool the total mixture and to heat the water temperature. In the alternative the water in settling tank 27 may be discarded through conduit 82 and fresh water may be introduced into the system through line 83. The heated water, whether it is in the form of a vapor or liquid, is removed through conduit 12 to be utilized as a heat source for other operations.

It is noted that the tube bundle 2 provides a means to exchange heat between a total effluent at relatively high temperatures and water at relatively low temperatures. Actually, the temperature differential between the top of the tube bundle tube and the lower end of the tube bundle 2 may be considerably high. However, the structure of this particular tube bundle is such that even with high temperature differentials between the top and bottom of such a tube bundle no structural strains are permitted to form in the column walls or in the tube bundle itself. Also, the particular arrangement of the tube bundle does not reverse the flow as is found in prior art floating tube bundles. In such floating tube bundles the floating tube sheet had a cover which reversed the flow of the mixture or effluent to be cooled. In the present arrangement, no such provisions have been made, for, if water is lost through space 9 it is recovered in the settling portion of the chamber 27. It is readily seen that the apparatus of FIG. 1 may be modified to serve as heat exchange apparatus for many operations. For instance, a second tube bundle similar to tube bundle 2 may be placed below the first one to provide more heat exchange surface for the water and the total mixture. Also, quenching means may be placed in the heat exchange chamber in various locations.

Figure 2:
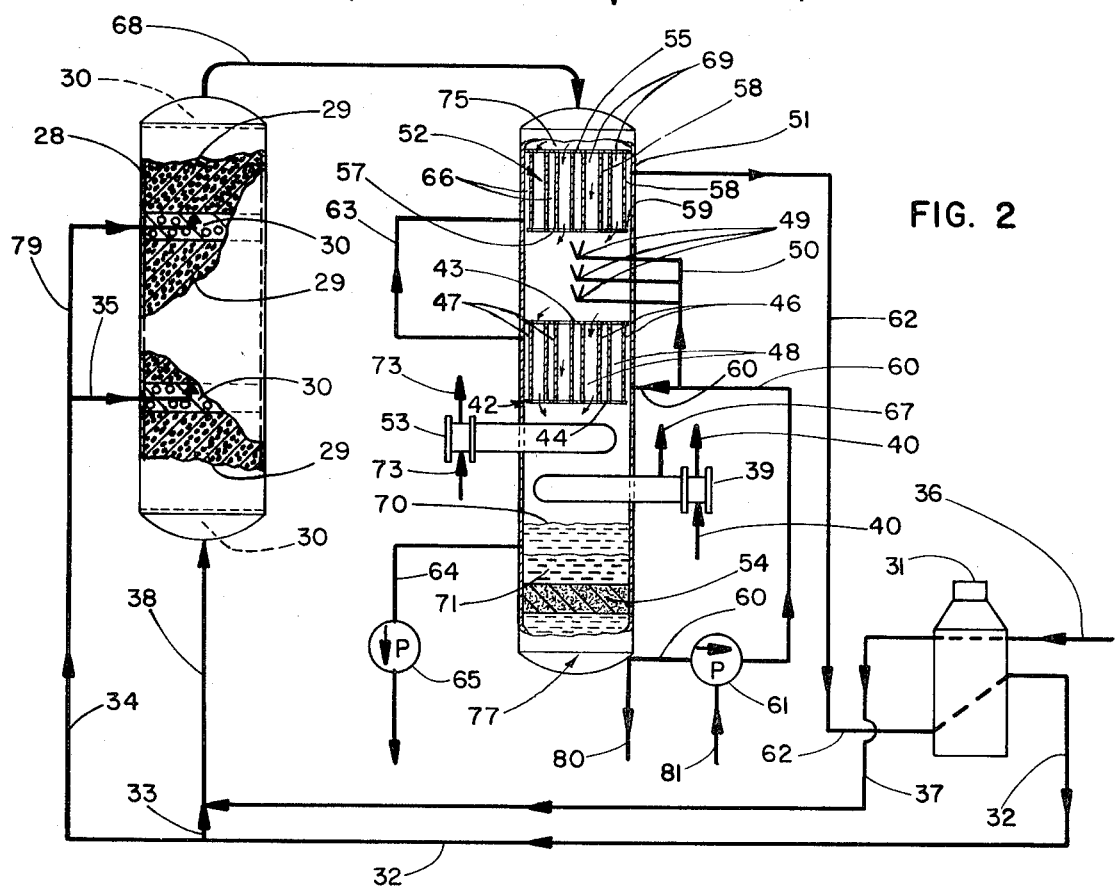
FIG. 2 is a preferred embodiment of the apparatus for the conversion of a hydrocarbon.

Reference is now made to FIG. 2 of the drawing where a schematical illustration of an appaartus for the conversion of a hydrocarbon is shown. There is shown a reaction chamber 28 having a plurality of spaced apart catalyst beds 29 which provide means for converting the hydrocarbon. Above each bed and below the lowermost bed of catalyst particles are disposed distribution balls or spheres 30. The hydrocarbon is introduced into the reaction chamber through conduit line 38. Vapor conduits 35 and 79 are provided to introduce water vapor as a heat exchange medium into the reaction chamber between the beds of catalyst particles. Water vapor is also introduced through conduit line 33 into the hydrocarbon inlet 38. The reaction chamber 28 has special utility in the endothermic conversion of the hydrocarbon such as the dehydrogenation of ethylbenzene styrene. The introduction of steam between intermediate beds raises the temperature of the effluent intermediately, and thus, the introduction of the hydrocarbon initially into the reaction chamber does not require extreme high temperatures of initial reactants and steam. The apparatus of FIG. 2 is further comprised of a heat exchange chamber 51 which includes a floating tube bundle 52 disposed therein. Also included in the heat exchange chamber is a water cooled condenser 53, a second floating tube bundle 42 and a refrigerant condenser 39. The first floating tube bundle is comprised of a fixed horizontal tube sheet 55 which is attached to the interior walls of the heat exchange chamber. Also included is a horizontal floating tube sheet 57 spaced beneath the fixed tube sheet 55. A plurality of spaced apart heat exchange tubes 58 are attached between the two tube sheets. The plurality of tubes 58 establish heat exchange passageways 66 between the tubes and the chamber walls and mixture or effluent passageway 69 through the interiors of the tubes. It is noted that the interiors of the tubes communicate through the tube sheets. It is also noted that a small space 59 may exist around the floating of the tube sheet to permit sliding of the floating tube sheet without detrimental effects on the apparatus itself.

The second floating tube bundle 42 is similar to the first tube bundle and is comprised of a horizontal fixed tube sheet 43 connected to the heat exchange chamber and a floating tube sheet 44 spaced below tube sheet 43 in a manner permitting the floating tube sheet to slide in the chamber. Connected to the tube sheets 43 and 44 are a plurality of spaced apart heat exchange tubes 46 which establish heat exchange passageways 47 and mixture or effluent passageways 48. Although not shown tubes 46 as well as tubes 58 would be spaced over the entire lateral area of the chamber 51. It is noted that mixture passageways 48 communicate through the tube sheets 43 and 44. Connected to the downstream end of reaction chamber 28 and to effluent passageways 69 via manifold 75 is an effluent conduit 68 for introducing the total effluent from the downstream end of the reaction chamber into the effluent passageways 69. Between the floating tube bundles is located a plurality of water quench nozzles 49.

The lower portion of the heat exchange chamber 51 establishes a settling section or tank 77 which provides a means for settling and separating liquid water from the total effluent. A filter 54 is provided in the settling portion 77 to remove impurities within the condensed water 71. A conduit 60 and pump 61 connect to the settling portion 77 and provide a means for carrying the liquid water from the settling portion through the heat exchange passageways of the tube bundle 42. It is noted that the water is carried from heat exchange tubes 46 to heat exchange tubes 58 via conduit 63. Lines 50 carry water to the quenching nozzles 49. The condensed water from settling section 77 may be discarded through line 80 and fresh water may be introduced into the system via line 81.

Heat for the water and hydrocarbon is provided by heater 31. The hydrocarbon is initially carried into the heater via conduit 36 and after being raised to optimum temperature is carried to conduit 38 via conduit 37. A conduit 62 is provided at a downstream end of heat exchange tube bundle 52 and connects to heater 31. After heated to the desired temperature, the steam from heater 31 is carried through line 32, with branch lines 33 and 34 carrying the steam to the portions of the reactor chamber where needed. A conduit 64 and pump 65 are connected to the settling portion 77 of heat exchange chamber 51 to remove any condensed liquid hydrocarbon 70 from the settling portion. A condenser 53 is provided with supply line 73 downstream of tube bundle 42. A refrigerant condenser 39 with supply line 40 is provided downstream of condenser 53. A vapor outlet 67 is provided in conjunction with the refrigerant condenser to remove the remaining low boiling gases within heat exchange chamber 51.

In the production of styrene from ethylbenzene, the apparatus of FIG. 2 is used in the following manner. The ethylbenzene enters the heater 31 through line 36, and is raised in temperature to about 800° F. Water is initially put into the circuit through inlet line 81 and is heated to a temperature of about 1500° F. and is caused to enter line 32. In order to further heat the ethylbenzene and to increase the partial pressure, steam is added to the ethylbenzene via line 33, and the admixture of ethylbenzene and steam is passed into the catalytic reaction chamber via line 38. The admixture of steam and ethylbenzene passes into the catalyst bed at a temperature of from about 1000° F. to 1400° F., typically at a temperature of 1200° F. sufficient to convert ethylbenzene to styrene. As the reactants contact the catalyst in the first catalyst bed of the reactor chamber 28, there is a temperature decrease across the catalyst bed due to the endothermic nature of the reaction. Without additional heat being added, the decrease in temperature of the effluent leaving the first catalyst bed would be in the order of from 50° F. to 150° F. or more. Therefore, super heated steam is introduced into the effluent between the first two beds of catalysts via line 35 to heat the effluent and to increase the partial pressure thereof. After reaction in the second bed of catalyst, additional steam is introduced to increase the effluent issuing from the second bed of catalysts through line 79.

The total effluent leaves the reactor via line 68. It is noted that in the preferred embodiment of FIG. 2 the general flow through the reactor chamber is upward. The upward flow prevents blockage in the catalyst beds and also makes it possible to use shorter lengths of pipe between the catalyst reaction chamber and the heat exchange chamber which is preferably positioned to have a generally downward flow. The total effluent in line 68 would contain styrene, unconverted ethylbenzene, gaseous products including hydrocarbons and hydrogen which have been produced during the dehydrogenation reaction and heating steam. This total effluent is introduced into the heat exchange chamber and distributed into the effluent passageways 69 formed by the plurality of heat exchange tubes 58. Water is caused to flow in the heat exchange passageways 47 around tubes 58 to be in indirect heat exchange contact with the effluent. The tubes 58 are part of the floating tube bundle 52 which is of a novel design that permits movement of the elements of the tube bundle and which does not require a cover to reverse the flow of the effluent passing therethrough. Any water leaking from the heat exchange passageways through space 59 will fall eventually to the settling portion 77 of the heat exchanger. The effluent passes from the first floating tube bundle 52 into the portion of the heat exchange chamber having quench nozzles 49 where the effluent is quenched rapidly to at least 230° F. by introduction of water condensate from line 50. The total effluent plus any quenching water is passed through the second floating tube bundle 42 where further reduction of temperature takes place. The effluent is then passed through the condenser 53 which lowers the temperature of the total effluent to condense at least a part of the water in the effluent and portions of the hydrocarbon therein. A final refrigerant condenser 39 is provided so that substantially all the hydrocarbons are condensed with the exception of hydrogen, which is removed through conduit 67. The liquid portions of the total effluent settle in the settling portion 77 of the heat exchange chamber where the water is filtered through filter 54 and subsequently removed through conduit 60 and pumped to the floating tube bundles 52 and 42 and to the water quench nozzles 49. It should be noted that the water may be discarded through line 80 and fresh water introduced into the system via line 81. The portion of the water going through the water passageways of the tube bundles is removed via conduit 62 to be recycled through the heater 31 and subsequently through the reactor chamber 28. The hydrocarbon layer of liquid is removed via conduit 64 and pump 65 to be further refined in subsequent equipment.

Although the apparatus of FIG. 2 has been described with reference to reaction for the dehydrogenation of ethylbenzene to styrene, it is to be noted that the apparatus is equally applicable to other endothermic catalyst conversions of the aromatic hydrocarbons with some modification. For example, in the production of ethylene, a fractionator may be disposed between the final floating tube sheet and the water cooled condenser 53. Thus, such a modified apparatus may be utilized so that the more complex effluent resulting from a reaction to produce ethylene may be fractionated between the final condensers and the floating tube bundles. It should be noted that in the production of ethylene, the reaction chamber would be a thermal reactor instead of a catalyst reactor. Furthermore, it should be noted that the present apparatus is a schematical illustration. It is contemplated that the various parts of the heat exchange apparatus can be separate and disposed into different chambers. For example, floating tube bundles and the quench means may be placed in one heat exchange chamber and the condensers as well as the settling chamber may be placed in another heat exchange chamber in communication with the first one.

I claim as my invention:

1. An apparatus for the conversion of a hydrocarbon which comprises:
   (a) a reaction chamber having means for the converting of said hydrocarbon;
   (b) hydrocarbon inlet means connected to said reaction chamber for introducing said hydrocarbon therein;
   (c) vapor inlet means connected to said reaction chamber for introducing vapor water as a heat exchange medium into said reaction chamber to admix with said hydrocarbon and to maintain the temperature of the admixture at reaction conditions;
   (d) a heat exchange chamber within said reaction chamber;
   (e) a floating tube bundle contained within said heat exchange chamber comprising a substantially horizontal fixed tube sheet disposed completely across and attached to the interior of said heat exchange chamber, a substantially horizontal floating tube sheet spaced from the first tube sheet and disposed substantially across the heat exchange chamber, but unattached thereto and a plurality of spaced apart substantially vertical heat exchange tubes connected between said tube sheets with the interiors of said tubes communicating through said tube sheets, the interiors of said tubes establishing mixture passageways and the space around said tubes establishing heat exchange passageways;
   (f) means connected to the downstream end of said reaction chamber and to the mixture passageways of said tube bundle for introducing the total effluent from the downstream end of said reaction chamber into said mixture passageways;
   (g) condenser means disposed within said heat exchange chamber below said floating tube bundle and downstream of said mixture passageways for condensing at least a portion of the vapor water in said total effluent to a liquid water;
   (h) settling means within said heat exchange chamber below said floating tube bundle and downstream of said condenser means for settling and separating the liquid water from the total effluent;
   (i) means for carrying liquid water through the heat exchange passageways of said tube bundle, whereby said liquid water is in indirect heat exchange relationship with the total effluent and whereby the temperature of said water is raised and the temperature of the total effluent is lowered;
   (j) heater means communicating with the downstream end of said heat exchange passageways for heating the water therefrom to the extent where it may be utilized as a vapor heat exchange medium for said reaction chamber;
   (k) means for transferring the vapor water from said heater means to the vapor inlet means of said reaction chamber, and;
   (l) outlet means disposed downstream of said condenser means for removing separated fractions of said total effluent.

2. The apparatus of claim 1 further characterized in that said fixed tube sheet of the floating tube bundle is the uppermost tube sheet.

3. The apparatus of claim 1 further characterized in that a second floating tube bundle is disposed in said heat exchange chamber in series with said first floating tube bundle.

4. The apparatus of claim 1 further characterized in that water quench means is disposed downstream of the mixture passageways of said tube bundle for introducing liquid water in direct heat exchange relationship with the total effluent.

5. The apparatus of claim 1 further characterized in that a water quench means is disposed downstream and below the mixture passageways of said tube bundle in said heat exchange chamber for introducing liquid water in direct heat exchange relationship with the total effluent and in that a second floating tube bundle is disposed in said heat exchange chamber below said water quench means.

6. The apparatus of claim 1 further characterized in that means is connected to said settling means and to said heat exchange passageways for recycling and carrying condensed water from said settling means into said heat exchange passageways, whereby the condensed water from said total effluent provides the water for said heat exchange passageways.

References Cited

UNITED STATES PATENTS

| | | | |
|---|---|---|---|
| 3,515,766 | 6/1970 | Root et al. | 260—669 R |
| 2,691,665 | 10/1954 | Bailey | 202—158 X |
| 3,187,810 | 6/1965 | Helin et al. | 165—158 |

JAMES H. TAYMAN, Jr., Primary Examiner

U.S. Cl. X.R.

23—288 K, 288 R, 1 E; 260—669 R, 669 A; 165—145, 147, 158; 202—158; 261—148, 149, 152